US012618549B1

(12) United States Patent
Chen

(10) Patent No.: US 12,618,549 B1
(45) Date of Patent: May 5, 2026

(54) INDICATOR LIGHT MODULE FOR CHARGING PORT

(71) Applicant: Shining Victory International Holdings Co., Limited, Kowloon (HK)

(72) Inventor: Keng-Sheng Chen, New Taipei City (TW)

(73) Assignee: Shining Victory International Holdings Co., Limited, Kowloon (HK)

( * ) Notice: Subject to any disclaimer, the term of this patent is extended or adjusted under 35 U.S.C. 154(b) by 0 days.

(21) Appl. No.: 19/232,138

(22) Filed: Jun. 9, 2025

(51) Int. Cl.
| | |
|---|---|
| *F21V 23/04* | (2006.01) |
| *B60L 53/16* | (2019.01) |
| *B60Q 1/26* | (2006.01) |
| *B60Q 1/50* | (2006.01) |
| *F21V 17/16* | (2006.01) |
| *F21V 19/00* | (2006.01) |
| *F21Y 115/10* | (2016.01) |

(52) U.S. Cl.
CPC .............. *F21V 23/04* (2013.01); *B60L 53/16* (2019.02); *B60Q 1/2661* (2013.01); *B60Q 1/50* (2013.01); *B60Q 1/543* (2022.05); *F21V 17/16* (2013.01); *F21V 19/003* (2013.01); *F21Y 2115/10* (2016.08)

(58) Field of Classification Search
CPC ........ F21V 23/04; F21V 17/06; F21V 19/003; F21Y 2115/10; B60L 53/16; B60Q 1/543; B60Q 1/2661; B60Q 1/50
USPC ....................................................... 362/362
See application file for complete search history.

(56) References Cited

U.S. PATENT DOCUMENTS

| | | | | |
|---|---|---|---|---|
| 6,779,905 B1 * | 8/2004 | Mazursky | ................. | F21V 1/10 362/86 |
| 7,841,751 B2 * | 11/2010 | Mulani | ................ | A61B 5/0059 362/249.02 |
| 2008/0037251 A1 * | 2/2008 | Leslie | ..................... | F21V 15/01 362/374 |
| 2010/0172142 A1 * | 7/2010 | Ming-Chi | ........... | F21V 21/0965 362/370 |
| 2014/0043811 A1 * | 2/2014 | Kawase | ................... | F21K 9/61 362/235 |

FOREIGN PATENT DOCUMENTS

TW          M652527 U      3/2024

* cited by examiner

*Primary Examiner* — Laura K Tso
(74) *Attorney, Agent, or Firm* — RABIN & BERDO, P.C.

(57) ABSTRACT

Provided is an indicator light module for a charging port, mainly characterized in that a control circuit board and a light source assembly are integrated inside a body and connected to a power line, and then a button cover assembly and a light-transmitting mask are arranged on the body and sealed; with the structure of the light-transmitting mask having a first surface and a second surface connected to each other, the light generated by the light source component can be emitted from the first surface and the second surface at the same time, so that the indicator light module provides both the functions of an indicator light and a lighting lamp, thereby reducing the layout of the structural space inside the body, improving the space utilization rate inside the body, reducing costs, and meeting the waterproof requirements.

6 Claims, 4 Drawing Sheets

INDICATOR LIGHT MODULE FOR CHARGING PORT

BACKGROUND OF THE PRESENT INVENTION

1. Field of the Present Invention

The present invention relates generally to an indicator light module for a charging port of an electric vehicle.

2. The Prior Arts

Electric vehicles are generally provided with a charging port for connecting the charging gun of a charging pile for charging. The charging port is usually equipped with an indicator light, which indicates whether the charging gun is correctly connected to the charging port, whether it is in the charging state, the charging level, whether the charging is completed, etc. by the color or number of the indicator light. In addition, in order to allow users to smoothly connect the charging gun for charging at night or in an environment with insufficient light, some electric vehicles are also equipped with a lighting lamp at the charging port.

The conventional indicator light and lighting lamp provided at the charging port of the electric vehicle are two independent products arranged at the charging port, so the structure occupies a large space, the utilization rate of the installation space is low, and more waterproof structures need to be configured, which is costly.

SUMMARY OF THE PRESENT INVENTION

A primary objective of the present invention is to provide a single module that integrates the indicator light and the lighting lamp used for the charging port of an electric vehicle, that is easier to install, occupies small structural space to achieve high space utilization rate as well as low cost and excellent waterproof effect.

The indicator light module for the charging port provided by the present invention comprises: a body, having an inner space disposed with a circuit board positioning groove, an elastic buckle, and a positioning block, with two sides of the body respectively formed with a lamp hole and an opening connected to the inner space; a light source assembly, comprising a light source circuit board and at least one LED arranged on the light source circuit board, and the light source circuit board being arranged inside the inner space with the two opposite sides of the light source circuit board positioned by the elastic buckle and the positioning block, and the LED facing the lamp hole; a control circuit board, disposed in the circuit board positioning groove inside the inner space, and electrically connected to the light source circuit board through a wire; a button cover assembly, having a cover plate and buttons and legs provided on opposite sides of the cover plate, the cover plate covering the opening of the body so that the legs corresponding to conductive carbon particles on the control circuit board; a light-transmitting mask, having a first surface and a second surface connected to each other, the light-transmitting mask covering the lamp hole of the body; and a power line, electrically connected to the control circuit board; wherein, when the power line is energized, the button is subjected to a force so that the legs contact the conductive carbon particles on the control circuit board to form a conductive loop for the LED to emit light, and when the force applied to the button is released so that the legs do not contact the conductive carbon particles, the conductive loop is interrupted and the LED does not emit light.

In a preferred embodiment of the present invention, the circuit board positioning groove, the elastic buckle, and the positioning block are all formed integrally with the body.

Preferably, a buckle groove can be formed on one side of the light source circuit board, and the buckle groove and the elastic buckle are buckled with each other to fix the light source circuit board. Accordingly, when the light source circuit board is buckled by the elastic buckle, a stable effect is achieved so that the light source circuit board will not move.

In a preferred embodiment of the present invention, the area of the first surface of the light-transmitting mask is set to be larger than the area of the second surface. Accordingly, when the light-transmitting mask is set at the charging port of the electric charging vehicle, the first surface of the light-transmitting mask is used as a lighting lamp, and the second surface of the light-transmitting mask is used as an indicator light.

In a preferred embodiment of the present invention, the outer periphery of the cover plate and the inner periphery of the opening are sealed using laser welding technology. Accordingly, a simple but excellent waterproof effect is achieved between the button cover assembly and the body.

In a preferred embodiment of the present invention, the outer periphery of the light-transmitting mask and the inner periphery of the lamp hole are sealed by laser welding. Accordingly, a simple but excellent waterproof effect is achieved between the light-transmitting mask and the body.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
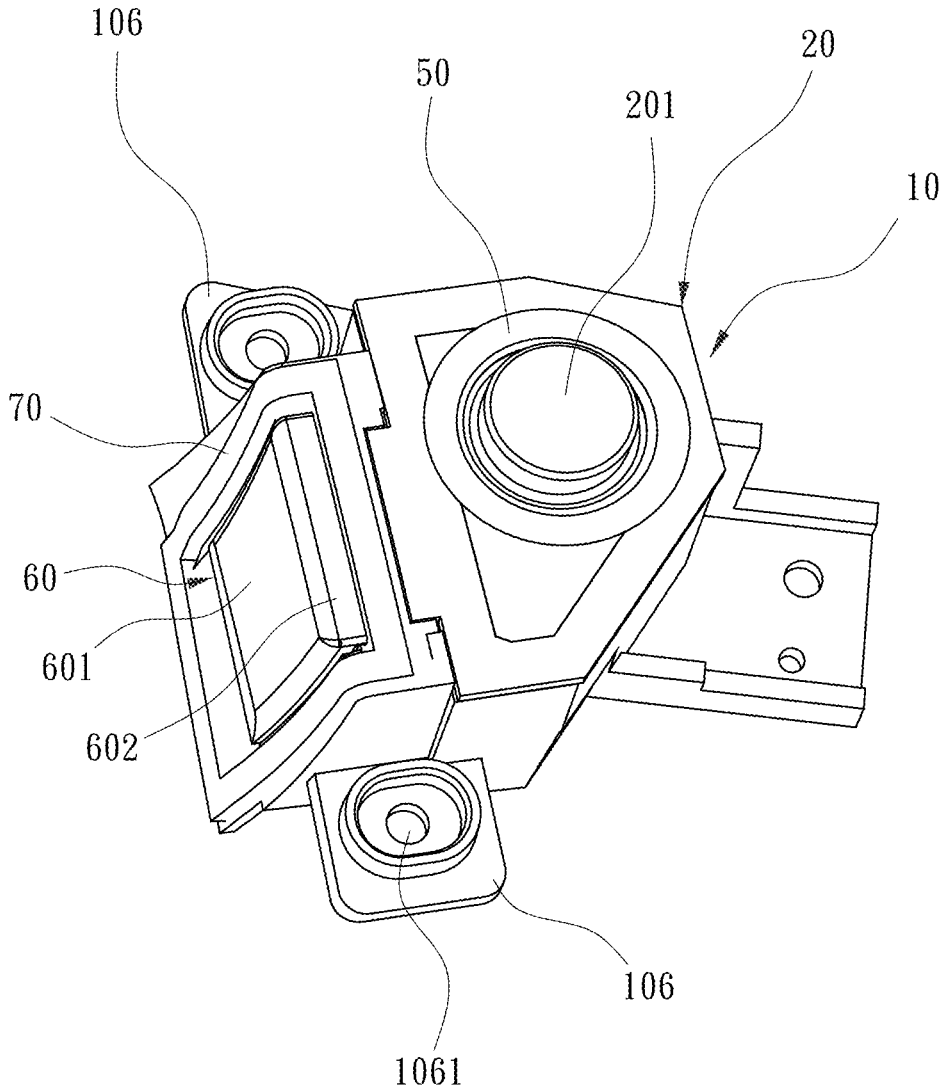
FIG. 1 is a perspective schematic view showing the overall appearance structure of the present invention after assembled.

In order to facilitate the understanding of the present invention, the present invention is described in detail below in conjunction with the accompanying drawings and embodiments. The accompanying drawings show a portion of the embodiments of the present invention, but not all of the embodiments. The present invention can be implemented in many different forms and is not limited to the embodiments described herein. On the contrary, the purpose of providing these embodiments is to enable technicians familiar with the field to have a more thorough and comprehensive understanding of the content of the present invention. Based on the embodiments in the present invention, all other embodiments obtained by ordinary technicians in the field without making creative changes are within the scope of protection of the present invention.

Unless otherwise defined, all technical and scientific terms used in this article have the same meaning as those generally understood by technicians in the field of the present invention. The terms used in the specification of the present invention are only for the purpose of describing specific embodiments and are not intended to limit the present invention.

As shown in FIGS. 1 to 4, the indicator light module for the charging port provided by the present invention includes: a body 10, having an inner space, the inner space is disposed with a circuit board positioning groove 102, an elastic buckle 104, and a positioning block 107 inside the inner space, and the two sides of the body 10 are respectively formed with a lamp hole 105 and an opening 101 connected to the inner space. A plurality of ears 106 are provided around the body 10, and the ears 106 are provided with fixing holes 1061, and screws can pass through the fixing holes 1061 to install and fix the body 10 to the charging port (not shown) inside the electric vehicle.

Figure 2:
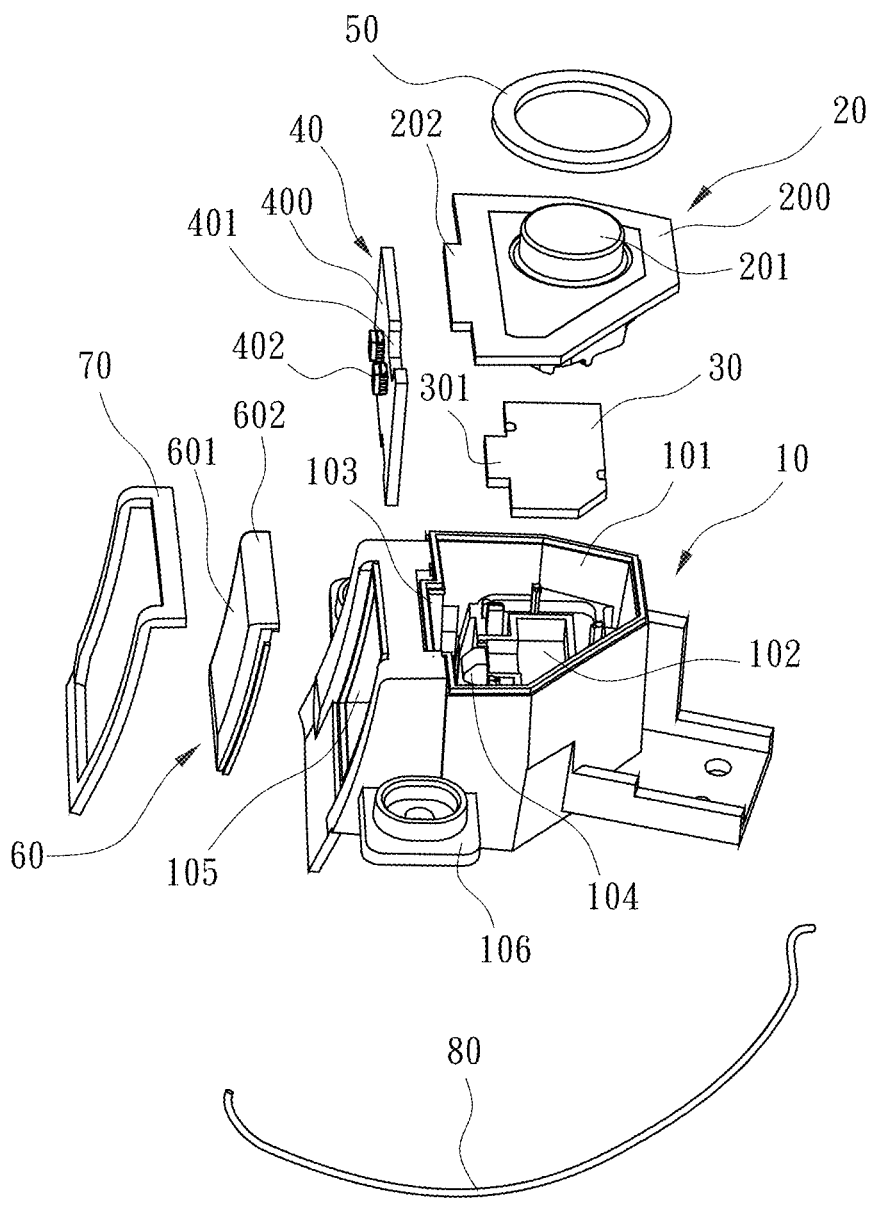
FIG. 2 is a perspective exploded view showing the assembly relationship of the main components included in the present invention.
Figure 3:
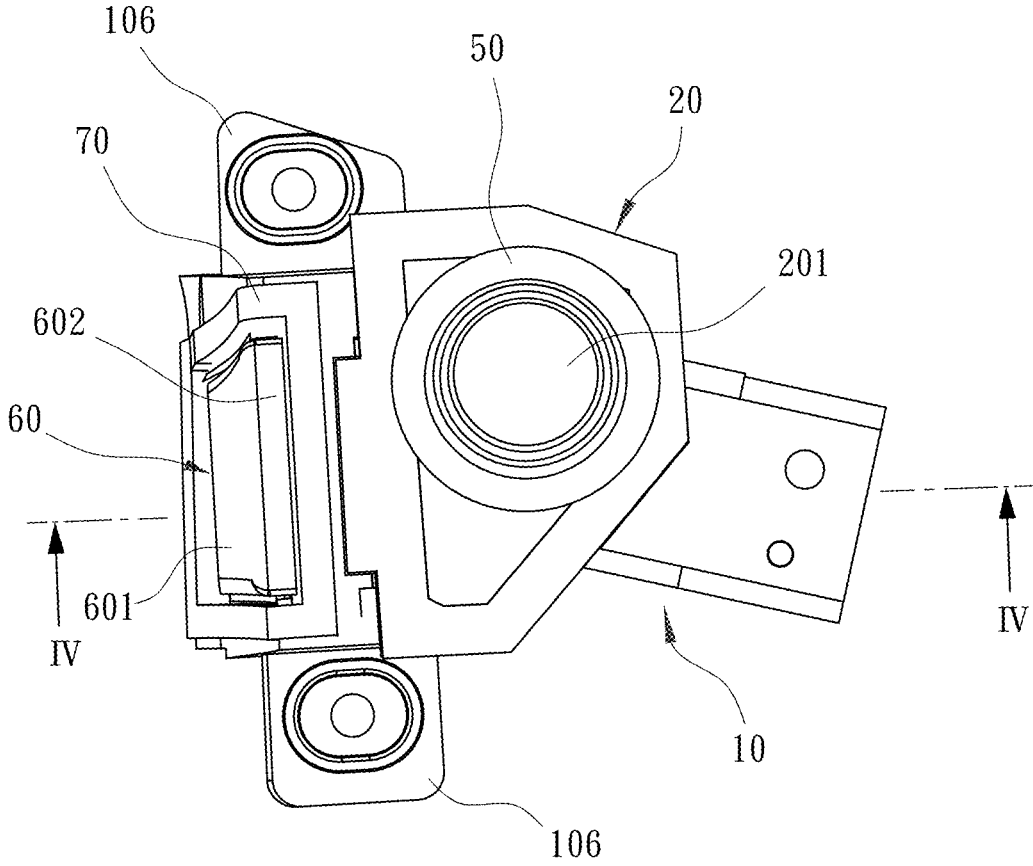
FIG. 3 is a top view showing the overall appearance structure of the present invention after assembled.
Figure 4:
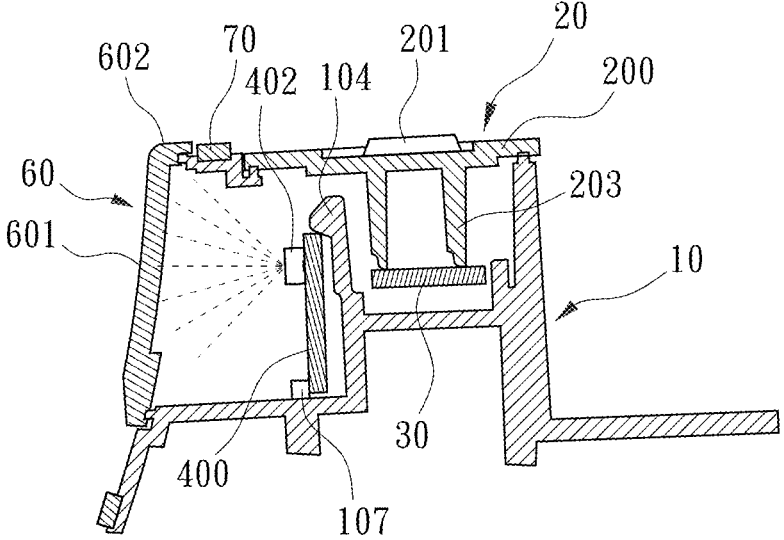
FIG. 4 is a planar cross-sectional view along a line IV-IV of FIG. 3.

Specifically, the body 10 can be formed into various appearance shapes according to the specifications of the electric vehicle, so as to facilitate its installation at the charging port on the vehicle body. As shown in FIG. 2, the body 10 is integrally formed of a plastic material to include an opening 101, a circuit board positioning groove 102, an elastic buckle 104, a lamp hole 105, an ear 106, and a positioning block 107, wherein the circuit board positioning groove 102 is formed at a position higher than the bottom of the inner space of the body 10 and corresponding to the opening 101, and the elastic buckle 104 is formed on one side of the circuit board positioning groove 102 and faces the lamp hole 105. The elastic buckle 104 extends upward and forms a hook on the side of its free end facing the lamp hole 105. The positioning block 107 is formed near the bottom of the inner space of the elastic buckle 104; that is, there is a specific distance between the positioning block 107 and the root of the elastic buckle 104, and the distance provides a light source circuit board 400 of the light source assembly 40 to be placed therein and fixed.

More specifically, the light source assembly 40 includes a light source circuit board 400 and at least one light-emitting diode (LED) 402 disposed thereon; a recessed buckle groove 401 is formed on one side of the light source circuit board 400, and when the other side of the light source circuit board 400 abuts against the side of the positioning block 107 facing the elastic buckle 104, the upper side of the light source circuit board 400 is pushed toward a hook of the elastic buckle 104, and the hook uses the elasticity of the elastic buckle 104 to buckle the buckle groove 401. In other words, the opposite sides of the light source circuit board 400 are positioned by the elastic buckle 104 and the positioning block 107, and the hook buckles the buckle groove 401 to prevent the light source circuit board 400 from shifting laterally. In such a configuration, the LED 402 faces the lamp hole 105; wherein the LED 402 is electrically connected to the light source circuit board 400, and can be designed to emit light of a specific color according to the application. Based on the circuit design on the light source circuit board 400, the light emission and light emission mode during charging can both be set.

The control circuit board 30 is used to control the operation of the light source assembly 40. It is arranged in the circuit board positioning groove 102 inside the inner space and is electrically connected to the light source circuit board 400 through a wire. The control circuit board 30 is electrically connected to the power line 80, and the power line 80 is extended out of the body 10. The power line 80 is used to connect to the power supply equipped in the vehicle to provide the power required to operate the control circuit board 30 and the light source assembly 40. Preferably, a protrusion 301 can be formed on one side of the control circuit board 30, and a concave portion (not shown in the figure) can be formed correspondingly on one side of the circuit board positioning groove 102, so that after the control circuit board 30 is placed in the circuit board positioning groove 102, the protrusion 301 is embedded in the concave portion to assist in positioning, and then the control circuit board 30 is locked with screws.

The button cover assembly 20 is to operate the control circuit board 30 and thereby control whether the LED 402 of the light source assembly 40 emits light. The button cover assembly 20 has a cover plate 200 and buttons 201 and legs 203 arranged on two opposite sides of the cover plate 200. The surrounding contour shape of the cover plate 200 roughly corresponds to the shape around the opening 101. After the cover plate 200 is placed to cover the opening 101, the periphery of the cover plate 200 and the periphery of the opening 101 are sealed by laser welding to achieve the effect of fixing and preventing moisture from penetrating into the body 10. At the same time, the legs 203 correspond to the conductive carbon particles (not shown in the figure) on the control circuit board 30. Preferably, a protrusion 202 can be formed on one side of the cover plate 200, and a notch 103 is correspondingly formed on one side of the opening 101, so that the cover plate 200 can cover the opening 101 by clamping the protrusion 202 with a tool. The cover plate 200 is fixed to the opening 101 by laser welding after the covering is completed, and the sealing is completed at the same time. Accordingly, when the button 201 is pressed, the leg 203 is driven to touch the conductive carbon particles set on the control circuit board 30 to make the circuit conduct current, so that the LED 402 of the light source assembly 40 emits light. When the button 201 is released, the leg 203 is separated from the conductive carbon particles to interrupt the current of the circuit on the control circuit board 30, so that the LED 402 of the light source assembly 40 does not emit light.

Furthermore, when the indicator light module of the present invention is installed on the charging port of the vehicle, when the cover of the charging port is opened, the linkage connected to the cover presses the button 201, thereby making the LED 402 light up through the control circuit board 30 and the light source circuit board 400. When the cover of the charging port is closed, the linkage connected to the cover is separated from the button 201, thereby interrupting the current and stopping the LED 402 from lighting up. Accordingly, in order to prevent the linkage used to press the button 201 from hitting the cover plate 200 when the cover of the charging port is opened, a button gasket 50 can also be set around the button 201 to provide protection.

The light-transmitting mask 60 is formed in one piece with a light-transmitting material (e.g., plastic, acrylic, glass, etc.), and has a first surface 601 and a second surface 602 connected to each other (e.g., the first surface 601 and the second surface 602 are connected to each other in an L shape), wherein the area of the first surface 601 is larger than the area of the second surface 602. The lamp hole 105 is formed in an L shape corresponding to the light-transmitting mask 60, and after the light-transmitting mask 60 covers the lamp hole 105, the periphery of the light-transmitting mask 60 and the periphery of the lamp hole 105 are fixed and sealed by laser welding, so that the first surface 601 corresponds to the larger area of the lamp hole 105, and the second surface 602 corresponds to the smaller area of the lamp hole 105. After the light-transmitting mask 60 is installed on the lamp hole 105, a mask gasket 70 is set on the periphery of the light-transmitting mask 60 to protect the periphery of the light-transmitting mask 60 from impact and also provides a decorative function. When the LED 402 emits light, the light can be emitted through the first surface 601 and the second surface 602 at the same time. In addition to being an indicator light, it also functions as a lighting lamp.

Compared with the conventional indicator light device for the charging port, the indicator light module for the charging port of the present invention has the following advantages:

1. The space utilization rate of the space inside the body is high.
2. Individual functions are integrated together to reduce product performance waste.
3. The button cover assembly and the light-transmitting mask and the body can all meet excellent waterproof requirements.
4. Instead of using the conventional LED with a lens to emit light, the LED light is directly transmitted. The excellent optical design of the transparent structure keeps the light effect unchanged, but reduces the cost.
5. When the LED emits light, the first surface and the second surface of the light-transmitting mask emit light at the same time, which provides the effect of both an indicator light and a lighting lamp.
6. The structure inside the body is simplified, and the light source circuit board can be effectively fixed.
7. The control circuit board uses conductive carbon particles, instead of the conventional micro switch, which reduces the cost and has a better feel when pressing the button.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An indicator light module for a charging port, comprising:

a body, having an inner space disposed with a circuit board positioning groove, an elastic buckle, and a positioning block, with two sides of the body respectively formed with a lamp hole and an opening connected to the inner space;

a light source assembly, comprising a light source circuit board and at least one LED arranged on the light source circuit board, and the light source circuit board being arranged inside the inner space with the two opposite sides of the light source circuit board positioned by the elastic buckle and the positioning block, and the LED facing the lamp hole;

a control circuit board, disposed in the circuit board positioning groove inside the inner space, and electrically connected to the light source circuit board through a wire;

a button cover assembly, having a cover plate and buttons and legs provided on opposite sides of the cover plate, the cover plate covering the opening of the body so that the legs corresponding to conductive carbon particles on the control circuit board;

a light-transmitting mask, having a first surface and a second surface connected to each other, the light-transmitting mask covering the lamp hole of the body; and a power line, electrically connected to the control circuit board;

wherein, when the power line is energized, the button is subjected to a force so that the legs contact the conductive carbon particles on the control circuit board to form a conductive loop for the LED to emit light, and when the force applied to the button is released so that the legs do not contact the conductive carbon particles, the conductive loop is interrupted and the LED does not emit light.

2. The indicator light module for the charging port according to claim 1, wherein the circuit board positioning groove, the elastic buckle, and the positioning block are all formed integrally with the body.

3. The indicator light module for the charging port according to claim 2, wherein a buckle groove is formed on one side of the light source circuit board, and the buckle groove and the elastic buckle are buckled with each other to fix the light source circuit board.

4. The indicator light module for the charging port according to claim 3, wherein an area of the first surface of the light-transmitting mask is set to be larger than an area of the second surface.

5. The indicator light module for the charging port according to claim 4, wherein an outer periphery of the cover plate and an inner periphery of the opening are sealed using laser welding.

6. The indicator light module for the charging port according to claim 4, wherein an outer periphery of the light-transmitting mask and an inner periphery of the lamp hole are sealed by laser.

* * * * *